July 11, 1939.　　　T. G. NYBORG　　　2,165,759
DRIVING UNIT FOR BELT CONVEYERS
Filed Dec. 16, 1936　　　3 Sheets-Sheet 1

INVENTOR
Tage G. Nyborg
BY
ATTORNEY

July 11, 1939.   T. G. NYBORG   2,165,759
DRIVING UNIT FOR BELT CONVEYERS
Filed Dec. 16, 1936   3 Sheets-Sheet 2

INVENTOR
Tage G. Nyborg
BY
ATTORNEY

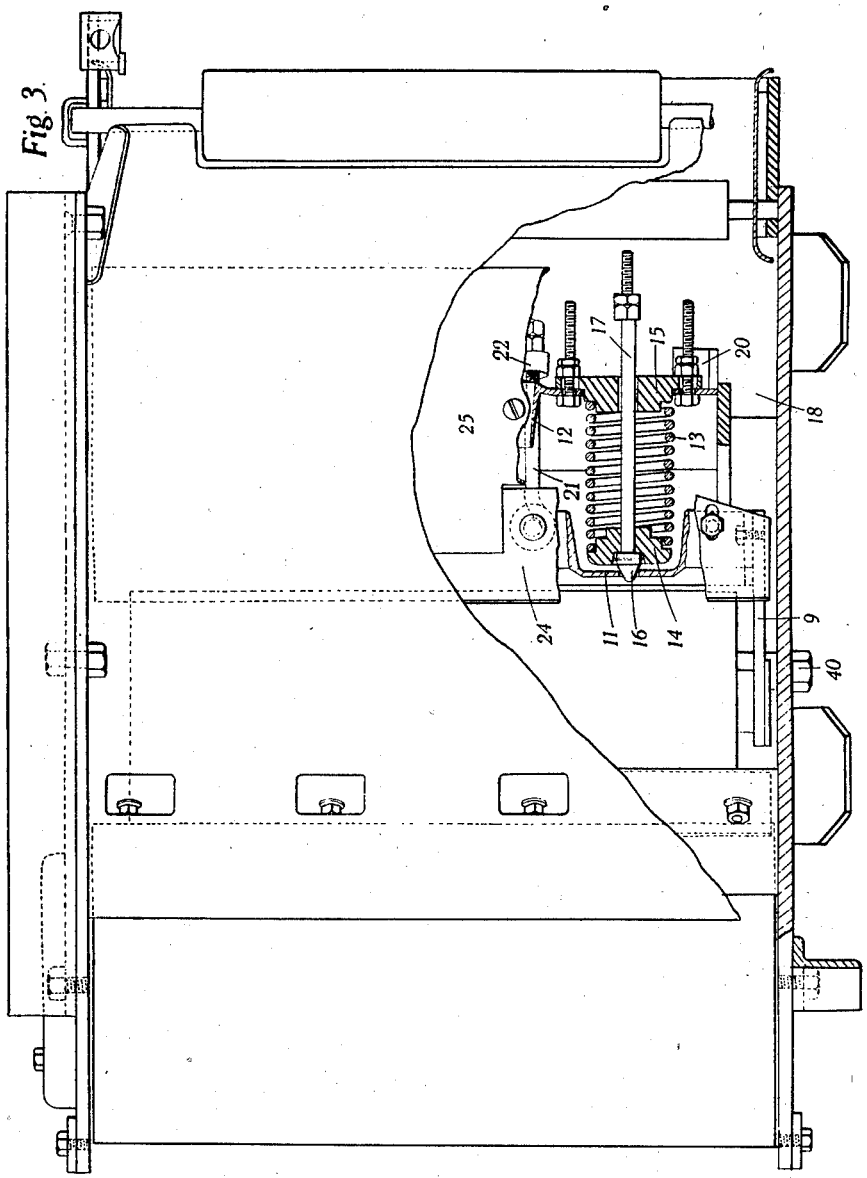

Patented July 11, 1939

2,165,759

UNITED STATES PATENT OFFICE 2,165,759

DRIVING UNIT FOR BELT CONVEYERS

Tage Georg Nyborg, Worcester, England, assignor to The Mining Engineering Company Limited, Worcester, England Application December 16, 1936, Serial No. 116,214
In Great Britain March 6, 1936

6 Claims. (Cl. 198—203)

This invention relates to belt conveyers and has for its object to provide improved driving units therefor.

In conveyer driving units designed for use in coal mines and the like any delay in repairing or replacing a defective or damaged part may result in loss of output and render impossible the correct rotation of work processes thus causing financial losses far in excess of the value of the damaged parts.

Belt conveyers provided with driving units of the spring-pressed jockey-pulley or "mangle-roller" type are now employed to a considerable extent in mines where height and space is strictly limited. In such circumstances, and more especially with the tendency to employ welded rather than removable bolts in the enclosure of the drive, the removal and replacement of an essential component, such as a spring, may entail considerable delay and expense.

The present invention provides a driving head or driving unit for a belt conveyer in which the spring-pressed pulley and its associated components are assembled as a self-contained easily removable and replaceable unit. Thus, a mangle-roller unit comprising a jockey-pulley, pivot arms, operating springs and spring abutment and spring withdrawal mechanism are all mounted on a sub-frame located within the driving head by abutments, and preferably held in position by bolts or the like. The driving drum and associated elements, such as the shaft for the drum, bearings for the shaft, and housings for the bearings, may also be grouped in an easily removable unit which may be fixed in position, for example, by means of bolts or the like which secure the bearing housings to the framework of the driving head. It is preferred so to arrange the sub-frame of the jock-pulley unit that the reaction of the spring pressure and of any belt tension effective on the pulley is taken between permanent points of the main frame and the sub-frame and serves to hold the latter in its working position, any bolts or further securing means being to maintain the location rather than to take any substantial load.

Figure 1:
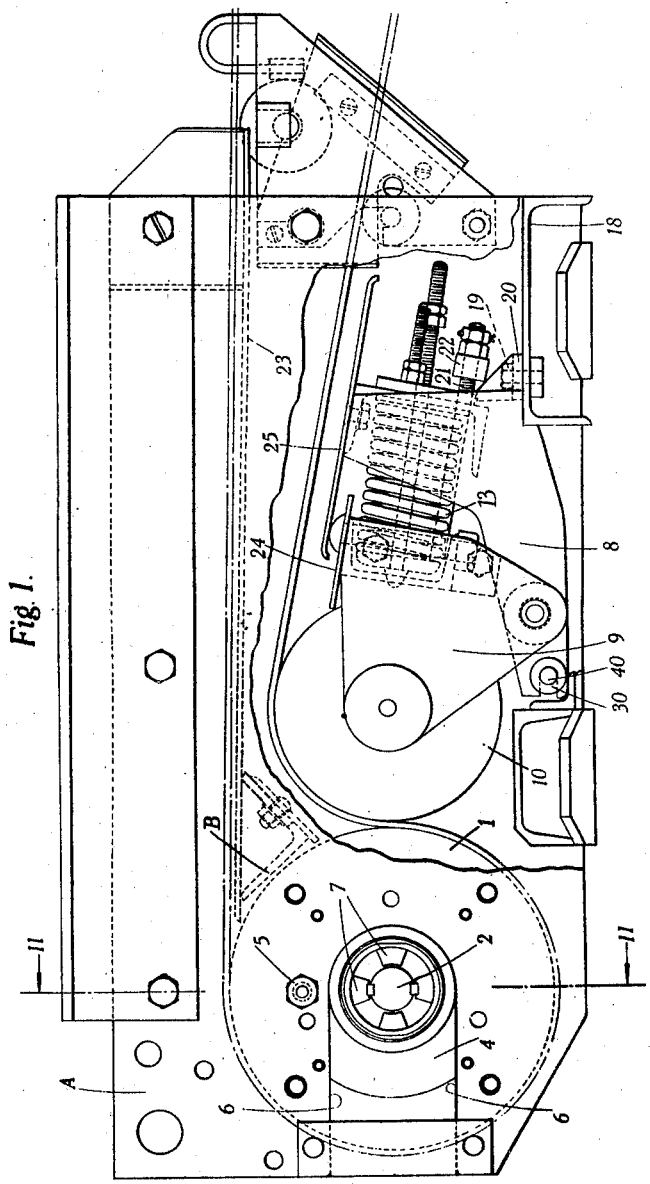
Figure 2:
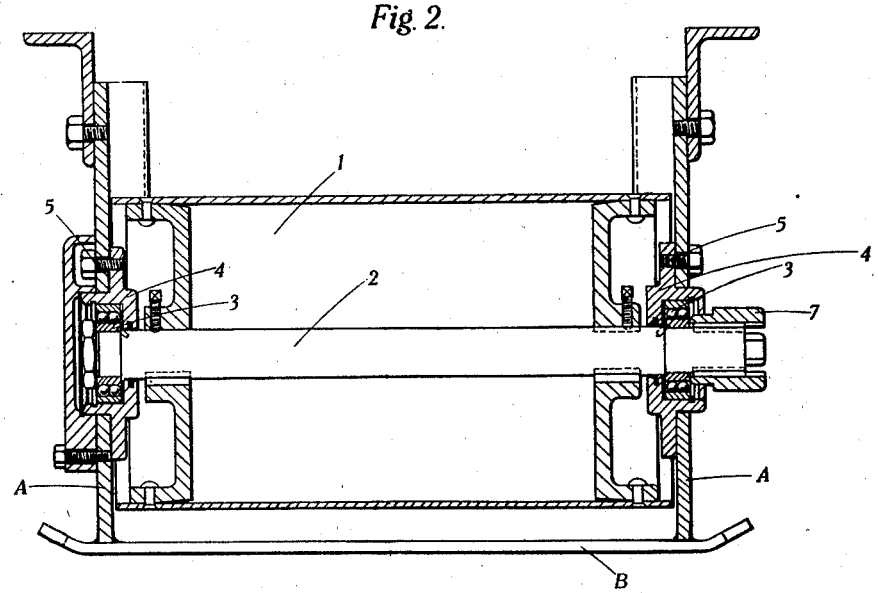

Other parts of the invention are embodied in the specific form of driving head assembly which it is now proposed to describe with reference to the accompanying drawings, in which Figure 1 is an elevation of the driving head assembly, one of the side plates of the framework being in part broken away, Figure 2 is a section on the line II—II of Figure 1, and Figure 3 is a plan view of the assembly, the belt being omitted and parts being broken away to reveal certain other parts.

The driving head assembly comprises driving drum and jockey-pulley units mounted in a welded framework including side plates A and cross members B.

The driving drum unit comprises a driving drum 1 keyed upon a shaft 2 and bearings 3 for the ends of the shaft mounted in housings 4. The bearing housings, which extend through the side plates A, are secured to the latter by bolts 5. The side plates are cut away as at 6 so that the complete unit can be withdrawn when the bolts retaining the housings have been removed.

The unit may be assembled with the usual extended shaft and dog clutch 7 projecting to either side to permit the reduction gear and motor to be mounted either right or left hand as desired.

The jockey-pulley unit has its components assembled on a frame comprising side members 8 and other members to be described below.

A pair of arms 9, which carry the ends of the shaft upon which the mangle-roller comprising a jockey-pulley 10 is rotatably mounted, are pivotally carried by the frame of the unit, one at each side thereof near the end of the side frame members 8.

The arms are pivoted to the supporting frame at points which lie near the plane which passes through the centre of the mangle roller and bisects the angle between the tangents to the surface of the roller formed by the belt, when the parts are all in the assembled relation. In this way it is ensured that any tension in the belt tends to press that end of the frame downwards. When the frame is pushed into position, notches 30 at the end in question embrace fixed abutments, in the form of bolts 40. The bolts 40 serve merely as abutments and this method of securing the frame could be replaced by some other equivalent method; for instance, the end of the frame could be inserted under a fixed lip to rest on a cross-frame member. Positive locking, as by bolts and holes, can be employed if considered desirable, either additionally or as an alternative.

The pivoted arms 9 are connected by a cross-member 11 of channel form. The frame of the jockey-pulley unit also has a cross member 12 of channel form at the end remote from the pulley, these two cross members serving as the abutments between which the pressure spring or springs 13 act.

In the form illustrated, two or more springs are used, according to the width of the conveyer. The springs 13 are used in compression between collars 14 and 15, the latter being fixed to the channel member 12. One spring only is revealed in Figure 2, the remaining spring or springs, which is or are symmetrically situated with relation to the centre line of the driving head, being hidden by parts not broken away. Each collar 14 transmits the pressure of the associated spring to the channel member 11 by means of an enlarged head 16 on the end of a spindle 17 which passes through the two collars; the springs thus serve to press the jockey-pulley towards the driving drum, the reactions being taken by the channel member 12 through the fixed collars 15.

An abutment for the frame of the jockey-pulley unit is provided by an inverted channel cross member 18 secured to the base of the welded main framework, and the unit is anchored to this member by means of bolts 19 passing through members 20 welded to the side members 8. It will be noted that the spring reaction tends to hold the jockey-pulley frame in position against this abutment, so that the bolts 19 or other securing means such as pins, screws or the like which may be used in their place serve really only to maintain its location against the abutments of the main frame, and are not actually necessary.

One or more eye-bolts 21 are arranged symmetrically with relation to the centre line of the driving head, secured at one end to the cross channel 11 and passing through apertures in the cross channel 12. A loose collar 22 on the shank of each eye-bolt, abuts against the face of the cross channel 12. Nuts on the eye-bolts upon being tightened up, press the collars 22 against the channel 12 and withdraw the jockey-pulley against the spring pressure to allow the belt to be fed through the driving gear.

A substantially horizontal plate 23 is provided spanning across the driving head between the upper and lower runs of the conveyer belt, and overlapping cover plates 24 and 25 are carried by the cross channels 11 and 12 respectively and serve to protect the unit against spillage from the lower run of the belt.

If it is desired to remove the driving drum unit, it is necessary only to undo the bolts securing the bearing housings and slide the unit out towards one end of the assembly. To remove the jockey-pulley unit, the nuts on the eye-bolts (or on the eye-bolt, if one only is provided) are tightened up to withdraw the jockey-pulley from the driving drum, and any additional securing means are released, whereupon the unit can be lifted and drawn out.

It is to be understood that, when referring to a spring-pressed pulley, equivalents such as pneumatic or gravity loading are intended to be included. The specific embodiment is described by way of example only and various modifications, other than those already referred to, may be made without departing from the invention.

I claim:

1. In a driving head or driving unit for a belt conveyer, an abutment carried by the frame of the driving head or unit, and a jockey-pulley unit comprising a sub-frame and a spring-pressed jockey-pulley mounted on said sub-frame, said sub-frame being notched for the engagement of said abutment.

2. A jockey-pulley unit for the driving unit of a belt conveyer, comprising a sub-frame, pivot arms mounted on said sub-frame, a jockey-pulley carried by said pivot arms, an operating spring for said jockey-pulley, and withdrawal mechanism for withdrawing said jockey-pulley against the action of said spring, all mounted on said sub-frame.

3. A driving head or driving unit for a belt conveyer comprising a driving head frame and driving drum mounted thereon, a jockey-pulley unit including a sub-frame and a spring-pressed jockey-pulley mounted on said sub-frame, a fixed abutment carried by the driving head frame and overlying a portion of said sub-frame, and locating means carried by the driving head frame for maintaining said portion of said sub-frame in position under said fixed abutment.

4. In a driving head for a belt conveyer, a main frame, a sub-frame removably mounted upon said main frame, a jockey-pulley mounted upon said sub-frame, a spring for said jockey-pulley mounted upon said sub-frame so as to be removable therewith from said main frame, and abutments upon said main frame whereby said sub-frame may be located within said main frame, said jockey-pulley being so arranged that any tension in the conveyer belt tends to maintain the location of said sub-frame by said abutments.

5. A jockey-pulley unit for the driving unit of a belt conveyer comprising a sub-frame, pivot arms carried by said sub-frame, a jockey-pulley carried by said pivot arms, a fixed abutment on said sub-frame, a spring abutting against said abutment to apply pressure to said pivot arms, and means for causing said pivot arms to swing against the pressure of said spring, all mounted on said sub-frame.

6. A jockey-pulley unit for the driving unit of a belt conveyer comprising a sub-frame, a pair of pivot arms carried by said sub-frame, a jockey-pulley carried by said pivot arms, a fixed abutment on said sub-frame, an abutment member spanning between said pivot arms, a compression spring confined between said fixed abutment and said abutment member spanning between said pivot arms, and screw means associated with said fixed abutment and said abutment member for causing said pivot arms to swing against the action of said spring.

TAGE GEORG NYBORG.

CERTIFICATE OF CORRECTION.

Patent No. 2,165,759. July 11, 1939.

TAGE GEORG NYBORG.

It is hereby certified that the above numbered patent was erroneously issued to "THE MINING ENGINEERING COMPANY LIMITED" whereas said patent should have been issued to the inventor, said "NYBORG" and The Mining Engineering Company Limited, of Worcester, England, as assignee of one-half interest only, as shown by the record of assignments in this office; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.